US008082489B2

(12) United States Patent
Jiang

(10) Patent No.: US 8,082,489 B2
(45) Date of Patent: Dec. 20, 2011

(54) USING A SPREADSHEET ENGINE AS A SERVER-SIDE CALCULATION MODEL

(75) Inventor: Xin (Edward) Jiang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1238 days.

(21) Appl. No.: 11/408,826

(22) Filed: Apr. 20, 2006

(65) Prior Publication Data
US 2007/0250764 A1    Oct. 25, 2007

(51) Int. Cl.
*G06F 17/00* (2006.01)
(52) U.S. Cl. ...................................................... 715/212
(58) Field of Classification Search ........... 715/212–220
See application file for complete search history.

(56) References Cited

U.S. PATENT DOCUMENTS

| | | | |
|---|---|---|---|
| 6,199,077 B1 * | 3/2001 | Inala et al. ..................... | 715/201 |
| 6,691,281 B1 * | 2/2004 | Sorge et al. ..................... | 715/234 |
| 6,766,512 B1 * | 7/2004 | Khosrowshahi et al. ...... | 717/140 |
| 6,988,241 B1 * | 1/2006 | Guttman et al. ............... | 715/220 |
| 2002/0078086 A1 * | 6/2002 | Alden et al. ................... | 707/503 |
| 2002/0165799 A1 * | 11/2002 | Jaffe et al. ...................... | 705/27 |
| 2002/0169799 A1 * | 11/2002 | Voshell .......................... | 707/503 |
| 2002/0188629 A1 * | 12/2002 | Burfoot ......................... | 707/503 |
| 2003/0009649 A1 * | 1/2003 | Martin et al. ..................... | 712/1 |
| 2003/0106040 A1 * | 6/2003 | Rubin et al. ................... | 717/106 |
| 2004/0088650 A1 * | 5/2004 | Killen et al. ................... | 715/503 |
| 2004/0111666 A1 * | 6/2004 | Hollcraft ........................ | 715/503 |
| 2004/0172592 A1 * | 9/2004 | Collie et al. ................... | 715/503 |
| 2004/0205595 A1 * | 10/2004 | DelGobbo et al. ............. | 715/513 |
| 2004/0210822 A1 * | 10/2004 | Kotler et al. ................... | 715/500 |
| 2004/0220977 A1 * | 11/2004 | Cho et al. ....................... | 707/201 |
| 2004/0237029 A1 * | 11/2004 | Medicke et al. ............... | 715/503 |
| 2005/0039114 A1 * | 2/2005 | Naimat et al. ................. | 715/503 |
| 2005/0193379 A1 * | 9/2005 | Tanenbaum .................... | 717/140 |
| 2005/0268215 A1 * | 12/2005 | Battagin et al. ............... | 715/503 |
| 2005/0273311 A1 * | 12/2005 | Lautt et al. ...................... | 703/22 |
| 2006/0095833 A1 * | 5/2006 | Orchard et al. ................ | 715/503 |
| 2007/0050698 A1 * | 3/2007 | Chopin et al. ................. | 715/503 |
| 2007/0050702 A1 * | 3/2007 | Chopin et al. ................. | 715/507 |
| 2007/0050704 A1 * | 3/2007 | Liu ................................. | 715/513 |
| 2007/0050706 A1 * | 3/2007 | Liu et al. ........................ | 715/513 |
| 2007/0208992 A1 * | 9/2007 | Koren ............................ | 715/503 |
| 2007/0219956 A1 * | 9/2007 | Milton ............................ | 707/3 |

OTHER PUBLICATIONS

Canfora et al.; A Visual Approach to Define XML to FO Transformations; Jul. 2002; ACM; SEKE '02: Proceedings of the 14$^{th}$ international conference on Software engineering and knowledge engineering; pp. 563-570.*

* cited by examiner

*Primary Examiner* — Laurie Ries
*Assistant Examiner* — Frank D Mills
(74) *Attorney, Agent, or Firm* — Kilpatrick Townsend & Stockton LLP

(57) ABSTRACT

This disclosure is directed to novel solutions for processing data in a manner similar to that employed by traditional spreadsheet applications (including, merely by way of example, evaluating expressions, producing reports and the like) without the need for a spreadsheet application. In an aspect, a spreadsheet calculation engine might be emulated in a Java environment, allowing for enhanced data input/output flexibility while still maintaining the ease with which traditional spreadsheet applications allow users to design a calculation model. In another aspect, the spreadsheet engine might be provided on a web server, database server and/or application server, allowing for data (including, for instance, reports comprising data processed and/or produced by the spreadsheet calculation engine) to be published easily (and, in some cases dynamically) on the web.

19 Claims, 6 Drawing Sheets

|   | A | B | C | D | E |
|---|---|---|---|---|---|
| 1 |   | January | February | March | Q1 |
| 2 | East | 121,000 | 100,000 | 130,000 | 351,000 |
| 3 | West | 85,000 | 95,000 | 105,000 | 285,000 |
| 4 |   |   |   |   |   |
| 5 | Total | 206,000 | 195,000 | 235,000 | 636,000 |

400

USING A SPREADSHEET ENGINE AS A SERVER-SIDE CALCULATION MODEL

FIELD OF THE INVENTION

The present invention relates to data processing systems in general and in particular to systems, methods and software for emulating an electronic spreadsheet application.

BACKGROUND OF THE INVENTION

The usefulness of spreadsheet applications, such as Microsoft Excel™, Lotus 1-2-3™, and the like, in business and other environments is well known. For example, in the financial departments of many organizations, financial analysts use spreadsheets as their calculation tools to consolidate and massage data, produce charts and the like. A typical spreadsheet operates using cells and formulas. For example, in a typical electronic spreadsheet created by a spreadsheet application, one or more cells will be used as fields or placeholders for input values. Another cell will comprise a formula, which operates on these input value(s), and the cell will then display an output value, representing a result of the formula. (Of course the output of one formula can, and often is, used as the input for formula(s) associated with one or more other cells.

This allows a great deal of flexibility, in that a user can quickly change the input value(s), and the spreadsheet application will provide a new output value based on the new input value(s). This combination of cells and formulas can be considered the "calculation model" of the spreadsheet. This calculation model specifies how various input values are to be identified and processed by the spreadsheet application.

Given the utility of spreadsheet applications at processing data, especially financial data, users often want to create business reports from a spreadsheet (e.g., from the input and/or output cells). Typically, however, spreadsheet applications do not provide robust reporting features, so to convert a spreadsheet's calculation model into a business report, a programmer generally will have to spend to convert all the calculation model to a standalone applet or application, using various programming languages, such as the JAVA programming language or XSLT. If the user wants to change the calculation model at all (e.g., by changing identification of input cells and/or the formulas for output cells), a new application and/or applet generally will have to be created.

Furthermore, while spreadsheet applications are very useful in allowing a user to provide input data by typing the data into specific cells, they often lack flexibility in accepting input data from other data sources. Merely by way of example, in many cases, data to be processed by the calculation model may be generated and/or provided by other applications (such as business applications, database applications, and the like). Such data might be represented by an XML file, a text file, and/or the like, and/or may be generated by SQL statements in a database application, etc. Often, the user will need to run a data import utility to get the data into the spreadsheet application, adding complexity and expense to the process.

BRIEF SUMMARY OF THE INVENTION

Embodiments of the invention provide novel solutions for processing data in a manner similar to that employed by traditional spreadsheet applications (including, merely by way of example, evaluating expressions, producing reports and the like) without the need for a spreadsheet application. In an aspect of some embodiments, a spreadsheet calculation engine is emulated in a JAVA environment, allowing for enhanced data input/output flexibility while still maintaining the ease with which traditional spreadsheet applications allow users to design a calculation model. In another aspect of some embodiments, the spreadsheet engine can be provided on a web server, database server and/or application server, allowing for data (including, for instance, reports comprising data processed and/or produced by the spreadsheet calculation engine) to be published easily (and, in some cases dynamically) on the web.

Hence, in an aspect, some embodiments can be thought of as emulating a spreadsheet. Merely by way of example, in accordance with a set of embodiments, a user might design an electronic spreadsheet using a spreadsheet application (such as MICROSOFT EXCEL, etc.), and embodiments of the invention can parse that spreadsheet to identify the calculation model employed by the spreadsheet (i.e., the functional arrangement of cells and formulas that process input data in the manner intended by the user) and emulate that calculation model outside the spreadsheet application. In this way, the user can design the spreadsheet in a familiar manner to process data according to the user's needs, but embodiments of the invention are not constrained by the traditional limits of spreadsheet applications. Merely by way of example, an embodiment of the invention might be designed to take as input a set of XML data, which would be difficult for a traditional spreadsheet to handle, and to publish an HTML report based on the processed input data.

One set of embodiments provides systems, including without limitation systems for processing data and/or emulating a spreadsheet application. Some systems might be implemented in a Java runtime environment. An exemplary system might comprise a spreadsheet parser, an input interface, a spreadsheet emulator, and/or an output interface. The spreadsheet parser might be configured to parse an electronic spreadsheet file to identify a calculation model implemented by the electronic spreadsheet file. In an aspect, the calculation model might specify how input values are to be processed;

The input interface, then, might be configured to receive a set of data in a structured format (such as an XML file, to name but one example). The structured format, in some cases, comprises information specifying how the set of data relates to the calculation model. The spreadsheet emulator, then, might comprise a calculation engine configured to process the data according to the calculation model, and/or the output interface might be configured to output, (merely by way of example, in XML format) a result from the calculation engine. The result might comprise one or more data elements that represent values obtained by processing the data according to the calculation model. In some cases, the system might further comprise a publisher module, which itself might comprise an eXtensible Stylesheet Language Formatting Objects ("XSL-FO") transformation engine.

Another set of embodiments provides methods. An exemplary method might comprise receiving an electronic spreadsheet file comprising a calculation model specifying how input values to the spreadsheet are to be processed. The electronic spreadsheet file might be parsed (e.g., with a computer) to identify the calculation model. Hence, in some cases, the method further comprises implementing the calculation model in a spreadsheet emulator (which might comprise a calculation engine). Upon receiving a set of data comprising a set of one or more input values for the calculation model, the calculation engine might process the set of data to produce a result comprising a set of one or more data elements, at least a portion of which might be output in a portable format (such as XML, XSL-FO, HTML, etc.). In a particular embodiment, the method might comprise receiving, with the set of data, at least one expression configured to user at least one of the one or more input values as input, and/or updating the calculation model with the at least one expression (for example, adding the at least one expression to the calculation model, replacing one or more existing expressions with the received expression (s), etc.).

A method in accordance with other embodiments might comprise receiving, at a computer, an electronic spreadsheet file. The electronic spreadsheet file might comprise a set of data including one or more example data elements, each of which is represented by an example cell identifier. The electronic spreadsheet file might further comprise one or more formulas configured to use at least one of the example data elements as input. The method, then, might include parsing the electronic spreadsheet file (e.g., with a computer) to identify one or more relationships between one or more of the formulas and one or more example cell identifiers, which represent the example data elements used as input by the formula(s).

A calculation model then can be generated. The calculation model might be configured to replicate the formulas(s) with respect cell identifiers(s). In an aspect of some embodiments, the calculation model is generated independent of a spreadsheet application. The calculation model then might be implemented in a spreadsheet emulator, which might comprise a calculation engine (which, in some embodiments, could use the calculation model to process provided data.)

Another set of embodiments provides systems, including without limitation systems comprising one or more processors, along with a set of computer instructions executable by the processor(s) to perform methods of the invention. A further set of embodiments provides computer programs, including without limitation computer programs that comprise a set of instructions executable by one or more computers to perform methods of the invention. (In an aspect, a computer program might be embodied and/or stored on a computer readable medium.)

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
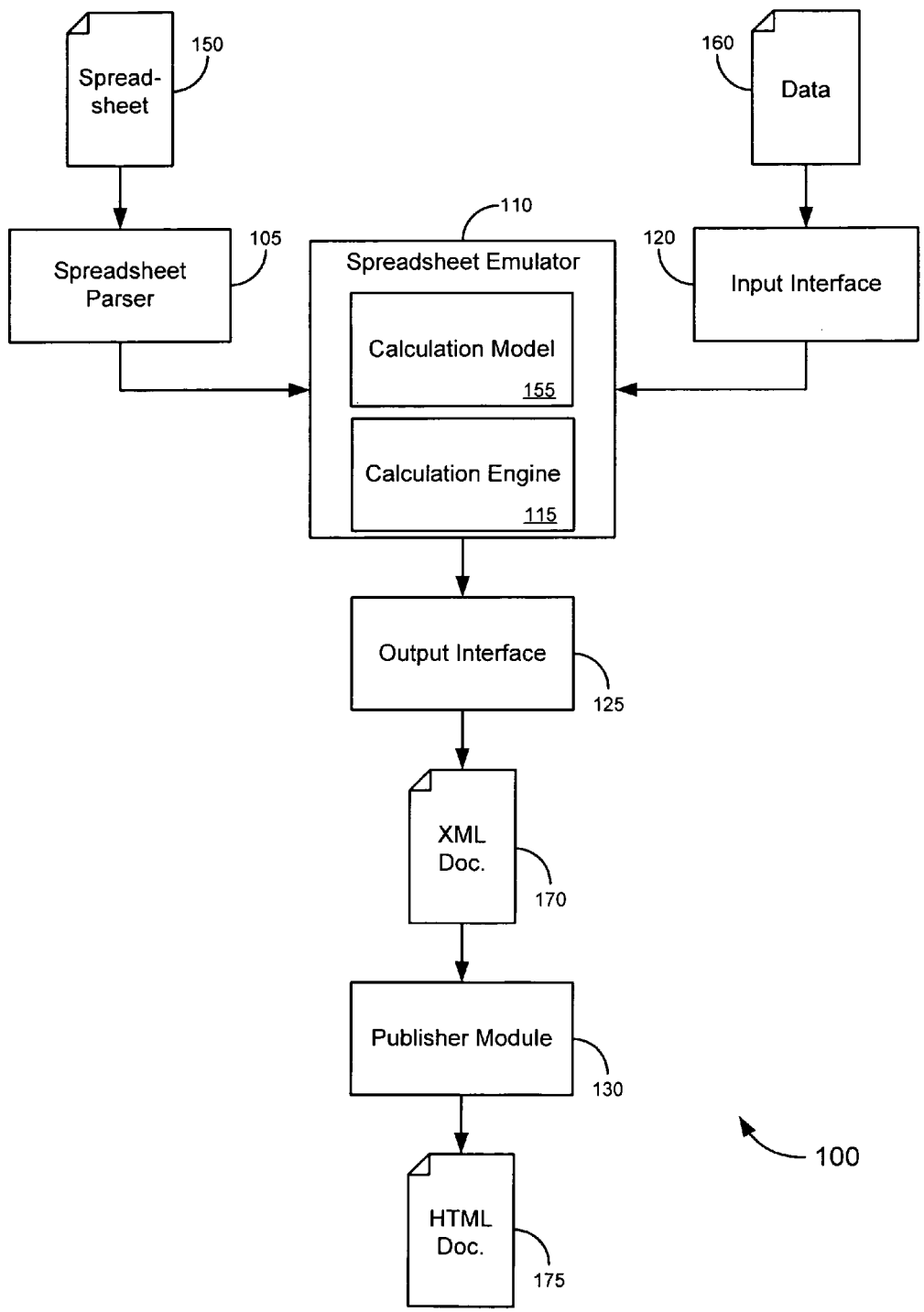
FIG. 1 is a block diagram illustrating a system for emulating a spreadsheet, in accordance with various embodiments of the invention.

Embodiments of the invention provide novel solutions for processing data in a manner similar to that employed by traditional spreadsheet applications (including, merely by way of example, evaluating expressions, producing reports and the like) without the need for a spreadsheet application. In an aspect of some embodiments, a spreadsheet calculation engine is emulated in a JAVA environment, allowing for enhanced data input/output flexibility while still maintaining the ease with which traditional spreadsheet applications allow users to design a calculation model. In another aspect of some embodiments, the spreadsheet engine can be emulated on a web server and/or application server, allowing for data (including, for instance, reports comprising data processed and/or produced by the spreadsheet calculation engine) to be published easily (and, in some cases dynamically) on the web.

More specifically, in an aspect, some embodiments can be thought of as emulating a spreadsheet. Merely by way of example, in accordance with a set of embodiments, a user might design an electronic spreadsheet using a spreadsheet application (such as MICROSOFT EXCEL, etc.), and embodiments of the invention can parse that spreadsheet to identify the calculation model employed by the spreadsheet (i.e., the functional arrangement of cells and formulas that process input data in the manner intended by the user) and emulate that calculation model outside the spreadsheet application. In this way, the user can design the spreadsheet in a familiar manner to process data according to the user's needs, but embodiments of the invention are not constrained by the traditional limits of spreadsheet applications. Merely by way of example, an embodiment of the invention might be designed to take as input a set of XML data, which would be difficult for a traditional spreadsheet to handle, and to publish an HTML report based on the processed input data.

Embodiments of the invention can include, inter alia, systems (such as computer systems, for example), methods (including, inter alia, computer-implemented methods) and software programs, which might embody the methods described in detail below and/or provide the functionality of the systems described in detail below. Merely by way of example, while several methods are described herein, one skilled in the art will appreciate that such methods can be implemented in a software program, such as, for example, a program written in the JAVA programming language, which can execute in a JAVA runtime environment familiar to those skilled in the art. (Of course, software programs in accordance with various embodiments may be written in a variety of programming languages, such as C, C++, C#, Perl, Ruby, Python, Visual Basic, and the like, to name but a few examples. Software programs in accordance with embodiments of the invention may comprise a plurality of components and/or may be integrated into a single monolithic application—the reader should appreciate that, while specific embodiments are described herein according to a particular functional arrangement, other arrangements are possible within the scope of the invention.

FIG. 1, therefore, illustrates an exemplary software-based system 100 that can be used to process data. The system 100 can be implemented as a set of computer instructions executable by one or more computers, such as the computers described below. In some embodiments, the system 100 includes a spreadsheet parser, which can receive an electronic spreadsheet and analyze the spreadsheet to identify a calculation model. (An electronic spreadsheet can be any computer document or file that embodies a calculation model. As but one example, documents produced by common spreadsheet applications, such as the .XLS files created by Microsoft Excel, can be considered electronic spreadsheets in accordance with some embodiments.

The system 100 also includes a spreadsheet emulator 110, which provides functionality that is similar in some ways to a traditional spreadsheet application. Merely by way of example, the spreadsheet emulator 110 might include a calculation engine, which can be configured used to perform calculations in accordance with embodiments of the invention.

The system 100 might further comprise an input interface 120, which can be used to receive data for input to the spreadsheet emulator 110. In some cases, there may be a plurality of input interfaces 120 for receiving data in a variety of forms. Merely by way of example, a first input interface might be configured to allow a user to provide input data manually. For instance, an input interface 120 might be configured to provide and/or receive HTML-based forms, in which the user can type various input data elements into a plurality of fields. Alternatively and/or additionally, an input interface might be a dedicated application (and/or a component thereof, that provides a graphical interface for a user to provide input.) A second input interface might be configured to receive data in batch format, such as data formatted according to a specified structure (an example is XML formatted data, but any other type of proprietary or standard data structuring formats, such as comma-separated values; various commercial document formats, such as .XLS format; etc., and the like may be used as well). A third type of input interface might be configured to receive data directly and/or indirectly from other applications, either via standardized and/or proprietary data exchange protocols (such as the open database connectivity ("ODBC") protocol, various structured query language ("SQL") commands, and/or the like) and/or via an application programming interface ("API"), which can be provided and/or supported by an input interface. In some cases, instead of providing a plurality of input interfaces, a single input interface 120 might support any or all of these types of data input.

In some embodiments, a user might be provided the option to specify expressions to determine the value of particular cells (as identified by cell identifiers, similar to above). Hence, instead of (and/or in addition to) receiving formulas via an example spreadsheet file, the system 100 might be configured to receive formulas via the same method as data is received for processing.

The system 100 might also comprise an output interface 125. Similar to the input interface 120, the output interface 125 might comprise a plurality of interfaces (for providing output data in a variety of different forms) and/or might support different forms of output in a single interface. In a set of embodiments, the output interface 125 is configured to receive data from the spreadsheet emulator 110 and provide that data in a desired form. A variety of output formats can be supported. Merely by way of example, in one embodiment, the output interface 125 is configured to provide output in an XML formatted-file. Similar to the supported input formats, other types of output might include graphical interfaces (e.g., for providing output directly to a user), various file types, and inter-application connectivity (via communication protocols such as those described above and/or APIs).

Optionally, the system 130 might include a publisher module 130, which can be configured to publish output data as HTML files, which can be served by a web server. Merely by way of example, as noted herein, the system 100 might be hosted on a web server, and/or the publisher module might be configured to produce and/or serve HTML documents based on the output from the spreadsheet emulator 110. In some cases, the publisher module 130 might be configured to receive output data (such as XML-formatted data) from the output interface 125 and/or create web pages from that output data. In other cases, the publisher module might be configured to receive output directly from the spreadsheet emulator 110 (in which case the output interface 125 might be omitted) and/or might be integrated with the output interface 125 in a single component.

In a set of embodiments, the publisher module 130 might include an XSL/FO transformation engine, such publishing the output might comprise transforming the XSL/FO file into one or more of a variety of formats, including without limitation, RTF, Microsoft Word™, MICROSOFT EXCEL, PDF, HTML and other formats. Provisional U.S. Patent Application No. 60/778,221, filed Mar. 1, 2006 by Jiang and entitled "XSL Translation and Transformation," the entire disclosure of which is hereby incorporated herein by reference, describes an exemplary XSL/FO transformation engine that might be incorporated in the publisher module 130 (and/or any other suitable component).

Figure 2:
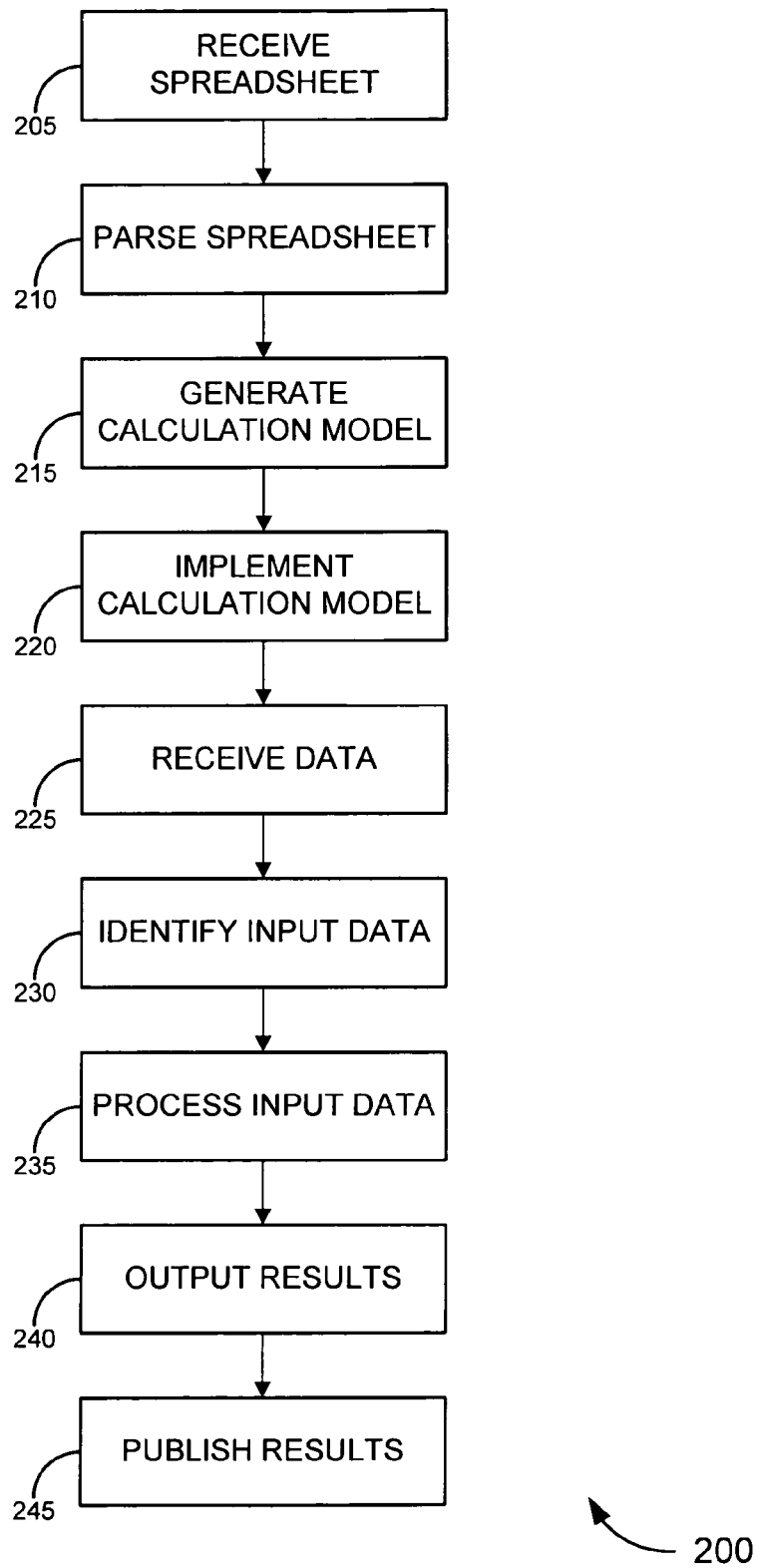
FIG. 2 is process flow diagram illustrating a method of providing spreadsheet data, in accordance with various embodiments of the invention.

A detailed description of the operation of FIG. 1 in accordance with some embodiments is provided by reference to FIG. 2, which illustrates a method 200 of processing data. (It should be noted, however, that the system of FIG. 1 can, in some embodiments operate in a manner different than that depicted by FIG. 2, and that the method 200 of FIG. 2 is not limited to any particular functional implementation, including the system 100 of FIG. 1).

In accordance with the method 100 of FIG. 1, an electronic spreadsheet 150 (also referred to as a "spreadsheet file") might be received (block 205) by the system 100. In an embodiment, the spreadsheet file 150 is used to provide the calculation model for processing input data. A variety of procedures can be used to receive the spreadsheet 150. Merely by way of example, in some cases, a user might be presented with a dialog box, allowing the user to select a spreadsheet file to provide the desired calculation model. In other cases, the electronic spreadsheet might be received via email and/or directly from another application. For instance, in an embodiment of the invention, a menu item (and/or toolbar button, etc.) might be provided within a spreadsheet application (such as Excel), allowing a user to transmit a spreadsheet file 150 directly from the application to the system 100.

As another example, a web interface might be provided to allow a user to upload the spreadsheet file into the system. Alternatively and/or additionally, a SQL loader program (familiar to those skilled in the art) could be used to load the spreadsheet file 150 into a database (for example, as a binary file). Other options are possible as well. For instance, a user might be provided the option to also use a standard (or proprietary) JAVA API to provide the system the URL for the spreadsheet file 150. In this way, for example, the system 100 might be configured to load the spreadsheet file 150 prior to each data processing run, allowing a user to make modifications to the spreadsheet file 150 without having to manually re-load the spreadsheet file 150 into the system.

After the spreadsheet file 150 has been received at the system 100, it can be parsed (block 210) (e.g., by the spreadsheet parser 105) to identify the calculation model employed by the spreadsheet file. As noted above, a calculation model generally will comprise one or more input cells, one or more output cells, and one or more formulas. Generally, each output cell will have a corresponding formula, which defines an expression, which, when evaluated, will provide a value for the output cell. One or more input cells, then, will be used to provide input values for the formula. In some cases, the received spreadsheet will comprise example values (i.e., example data elements) for each of the cells (as identified by example cell identifiers), as well as one or more formulas configured to use these example data elements as input. The formulas, then will define the values for the output cells (data elements) in the example. Parsing the spreadsheet file, then, can comprise identifying a relationship between the one or more formulas and the one or more example cell identifiers.

Figure 4:
FIG. 4 illustrates an exemplary electronic spreadsheet, which can be emulated by various embodiments of the invention.

It should be appreciated, moreover, that in many cases, an output cell might be an input cell for an additional formula. Consider, for example, the example spreadsheet 400 depicted by FIG. 4, which is designed to calculate revenue figures for a hypothetical company. The cells B2, C2 and D2 are input cells used to hold revenue values for the months of January, February and March, respectively, for an East region, while the cells B3, C3 and D3 are input cells holding revenue values for the same three months for a West region. The cells E2 and E3 are output cells, which hold quarterly revenue totals for the East and West regions, respectively. Hence, the cell E2 might have a corresponding formula of E2=B2+C2+D2, while the cell E3 might have a corresponding formula of E3=B3+C3+D3. Row 5 in the spreadsheet 400 comprises output cells, which hold total revenue values (across both regions). Hence, the cells in row 5 might have respective corresponding formulas of B5=B2+B3, C5=C2+C3, D5=D2+D3, and E5=E2+E3. From this example, then, it can be seen that cells E2 and E3 serve as both output cells, and input cells (for the formula corresponding to cell E5).

Figure 3:
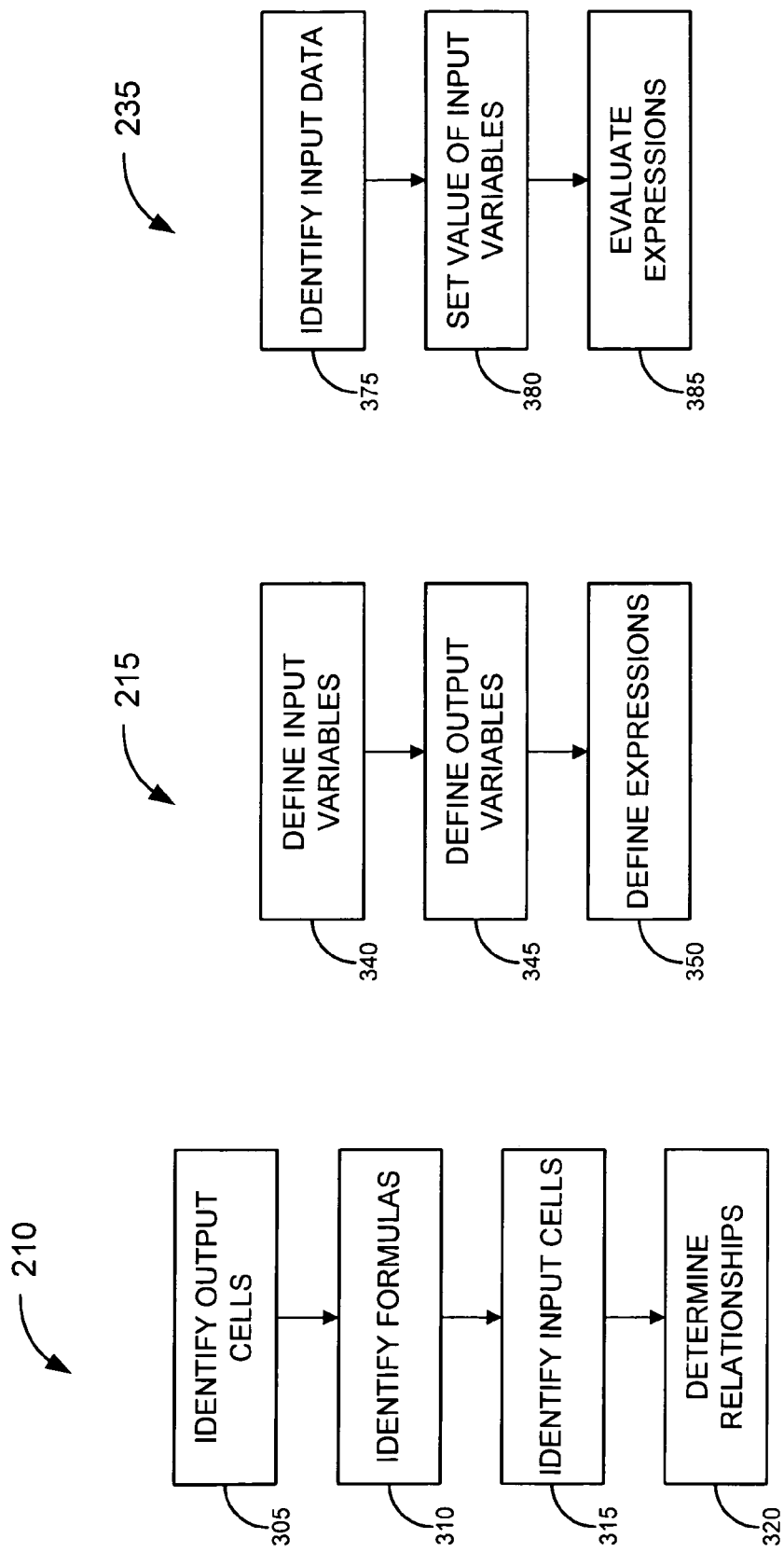
FIG. 3A is a process flow diagram illustrating a method of parsing an electronic spreadsheet, in accordance with various embodiments of the invention.
FIG. 3B is a process flow diagram illustrating a method of generating and/or implementing an spreadsheet, in accordance with various embodiments of the invention.
FIG. 3C is a process flow diagram illustrating a method of processing data with a calculation engine, in accordance with various embodiments of the invention.

Any of a variety of methods may be used to parse the spreadsheet 150. Merely by way of example, FIG. 3A illustrates an exemplary method of parsing a spreadsheet. According to the method of FIG. 3A, then, the spreadsheet parser 105 (or any other suitable component) can first identify a set of one or more output cells in the spreadsheet 150 (block 305). Merely by way of example, the spreadsheet parser 105 might parse each cell in the spreadsheet file 150 to identify any cells that have a corresponding formula. If a cell has a corresponding formula, then the cell can be considered an output cell (although, as noted above, it might also be an input cell for another formula).

Parsing the spreadsheet can also include identifying some or all of the formulas in the spreadsheet (block 310). Identifying a formula can include identifying which output cell the formula corresponds to and/or identifying any cells that are used to hold input values for the formula. Once all of the formulas are identified, each cell that holds data used for any input for any formula can be identified as an input cell (block 315). Parsing the spreadsheet 150 can also include determining relationships between the input cells, output cells and formulas (block 320). From the identified cells and formulas (and the relationships between them), the calculation model of the spreadsheet 150 can be identified.

Returning to FIG. 2, once the calculation model of the spreadsheet 150 has been identified, a matching calculation model 155 can be generated by the spreadsheet emulator 110 (block 215), so as to replicate the formulas (with respect to the cell identifiers of the example spreadsheet 150). It should be noted that, in some embodiments, the spreadsheet emulator 110 is a program separate from any spreadsheet application (such as MICROSOFT EXCEL) and that, accordingly, the calculation model can be generated and implemented independent of any spreadsheet application.

FIG. 3B illustrates one method of generating a calculation model 155 (although it should be appreciated that other methods could be used as well). The method of FIG. 3B can include defining a set of input variables (block 340). In an aspect, an input variable can be defined to correspond to each input cell in the spreadsheet 150. Similarly, a set of output variables can be defined (block 345), perhaps corresponding to the output cells in the spreadsheet 150. (It should be noted that a single variable can be used as an input variable and an output variable, for example, if it corresponds to a cell in the spreadsheet 150 that is both an input cell and an output cell.) Finally, a set of expressions can be defined (block 350). Generally, each expression denotes a relationship between one or more input variables and one or more output variables. In some embodiments, therefore, an expression may be defined to correspond to each formula in the spreadsheet 150, and a given expression may define a relationship between a set of input variables and an output variable, corresponding to the relationship between one or more input cells and an output cell, as defined by a formula corresponding to the output cell in the spreadsheet. Hence, the expression can be used in generating a calculation model to emulate the exemplary spreadsheet 400 of FIG. 4.

In some cases, certain output cells in a spreadsheet may not hold values that are of ultimate interest, but instead might be used merely to hold intermediate values (e.g., values that are used as input for other formulas. (A user might be given the opportunity, for example, to identify which cells in a spreadsheet are ultimately of interest to the user.) In such cases, the system 100 might optionally be configured to consolidate formulas as necessary. Merely by way of example, returning to the spreadsheet 400 of FIG. 4, if a user indicates that only the only output value of interest is the consolidated quarterly revenue total for all regions (i.e., cell E5), the generated calculation model might implement only input variables for cells B2–D2 and B3–D3, and might implement only one expression (D5=(B2+C2+D2)+(B3+C3+D3)).

In accordance with some embodiments, the method 300 can include implementing the calculation model 150 in the spreadsheet emulator 110 (block 220). Implementing the calculation model 150 can comprise loading the calculation model 150 into the calculation engine 115, such that the calculation engine 115 can process data using the calculation model 150). (In some cases, the procedures for generating the calculation model, as described above, and generating the calculation model can be combined, such that implementing the calculation model might comprise generating the calculation model.)

At block 225, a set of data 160 is received by the system 100. The set of data 160 might comprise a set of data elements, comprising a plurality of member data elements. One or more of the member data elements might be used as input for the calculation model, as described in further detail below. As noted above, one or more input interfaces 120 can be used to receive data, and there may be a variety of ways in which data may be received. After the data has been received, the system 100 (and/or a component thereof, such as the input interface 120, the spreadsheet emulator 110 and/or the calculation engine 115) identifies the input data (block 230). In some cases, the received data might comprise a plurality of data elements, and identifying the input data therefore might comprise determining which element of input data corresponds to each of the input variables defined in the calculation model 150. One skilled in the art will appreciate, based on the disclosure herein, that the procedures used to identify the input data often will vary according to the format of the input data. Merely by way of example, if the input data is received as an XML file, the tagging information in the XML file can be used to identify the input data. (For instance, an XML tag surrounding each element might identify the spreadsheet cell-and/or input variable-to which that data element corresponds.) Other procedures can be used to identify input data if data is received in other forms.

Further, as noted above, expressions corresponding to particular cells and/or output variables (as well, perhaps, as the output variables themselves) can be received in similar fashion. These received expressions and/or output cells/variables then can be used to update the calculation model to include the received expressions and/or output cells/variables. Merely by way of example, if a calculation model emulating a spreadsheet file includes an expression of C1=B1+A1, a set of data might be received comprising the following data elements: A1=32, B1=12 and D1=A1−B1. The calculation model, then might be updated to include a new output variable (D1), along with a corresponding expression (D1=A1−B1). The result of processing the data, then, might be two data elements: C1=44 and D1=20. (Of course, it should be noted that this method could be used to replace expressions already in the calculation model, for instance, if in the above example, the expression for D1 were assigned to the C1 variable. It should also be recognized that the calculation model could be generated entirely in this way, such that the procedures of receiving and parsing a spreadsheet file 150 could be omitted.)

The input data can then be processed (block 235). One exemplary method of processing input data is illustrated by FIG. 3C, although other methods can be used as well. In accordance with the method of FIG. 3C, input data might be identified (block 375), for example as described above. Hence, for each input variable in the calculation model, a member of the set of input values corresponding to the input variable can be identified. Then, using the identified input data, the values of each of the input variables can be set (block 380). Using these values, the expressions defined for each of the output variables can be evaluated (block 385), to produce output values. (This process may be performed iteratively, for example, if an output value from one expression is used as an input variable for another expression.)

If desired, the steps of receiving data, identifying input data, and processing the input data can be repeated as desired, if there are multiple sets of data to be processed. In some cases, there may be a facility for receiving multiple sets of data for processing in a batch mode. In other cases, single sets of data may be submitted to the system 100 multiple times.

After the data has been processed, the results can be output (block 240). As noted above, an output interface 125 may be used to output the results. In an embodiment, the results are output in a portable format. A portable format is any format that can be used by other applications and/or users without the need for extensive further conversion. Examples of portable formats include text, XSL/FO, CSV, XML HTML, PDF and the like. Merely by way of example, in an embodiment, outputting the results might comprise creating one or more XML documents 170 comprising the results. In some cases, the result might comprise a set of one or more data elements (which can include the values of one or more of the output variables and/or the values of one or more of the input variables). As noted above, one or more output interfaces 125 may be used to output the results in a variety of forms. Optionally, the results may be published (block 245), by a publisher module, for example as an HTML document 175 and/or web page.

In some cases, the desired output for the results may be a report. Hence the output interface 125 and/or the publisher module 130 may be configured to produce reports from the results. A variety of report formats may be supported. In a particular set of embodiments, as noted above, the results of the spreadsheet emulator might be output as an XSL/FO file. Accordingly, the publisher module 130 might include an XSL/FO transformation engine, such publishing the output might comprise transforming the XSL/FO file into one or more of a variety of formats, including without limitation, RTF, Microsoft Word™, MICROSOFT EXCEL, PDF, HTML and other formats. Provisional U.S. Patent Application No. 60/778,221, already incorporated by reference, describes an exemplary XSL/FO transformation process that might be utilized in publishing the output from the spreadsheet emulator.

Figure 5:
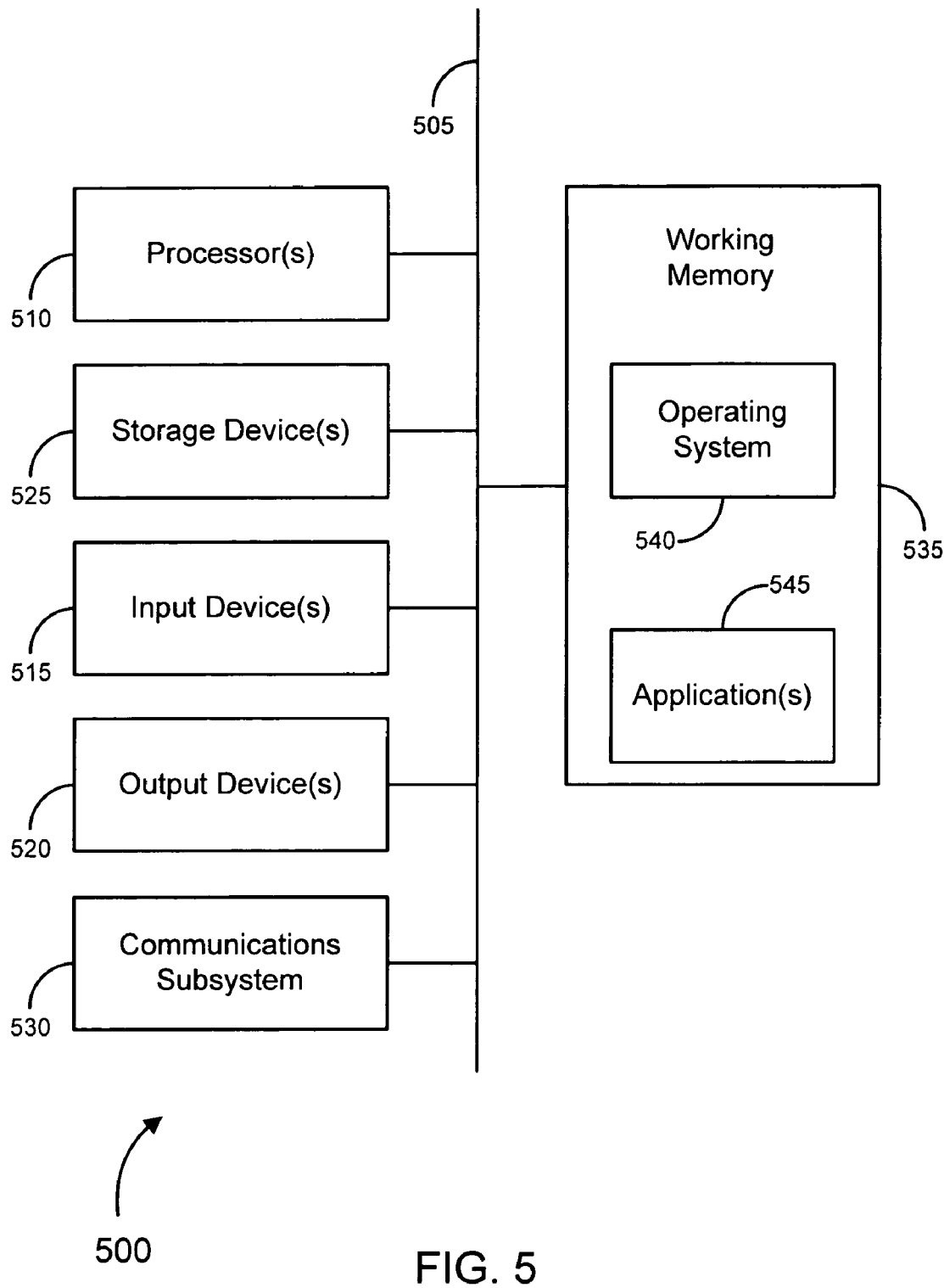
FIG. 5 is a generalized schematic diagram illustrating an architecture of a computer that can be used in accordance with various embodiments of the invention.

As noted above, some embodiments provide computer systems that are configured to process data and/or emulate spreadsheet applications. FIG. 5 provides a schematic illustration of one embodiment of one such computer system 500. The system 500 of FIG. 5 can also be used to execute software programs of the invention and/or to perform methods of the invention, as described above, for example. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. The computer system 500 is shown comprising hardware elements that can electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 5 might also include a communications subsystem 530; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 530 may permit data to be exchanged with a network and/or any other devices described herein. In many embodiments, the computer system 500 will further comprise a memory 535, which can include a RAM or ROM device, as described above.

The computer system 500 also can comprise software elements, shown as being currently located within a working memory 535, including an operating system 540 and/or other code 545, such as one or more application programs, which may comprise computer programs of the invention and/or may be designed to implement methods of the invention, as described herein. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 6:
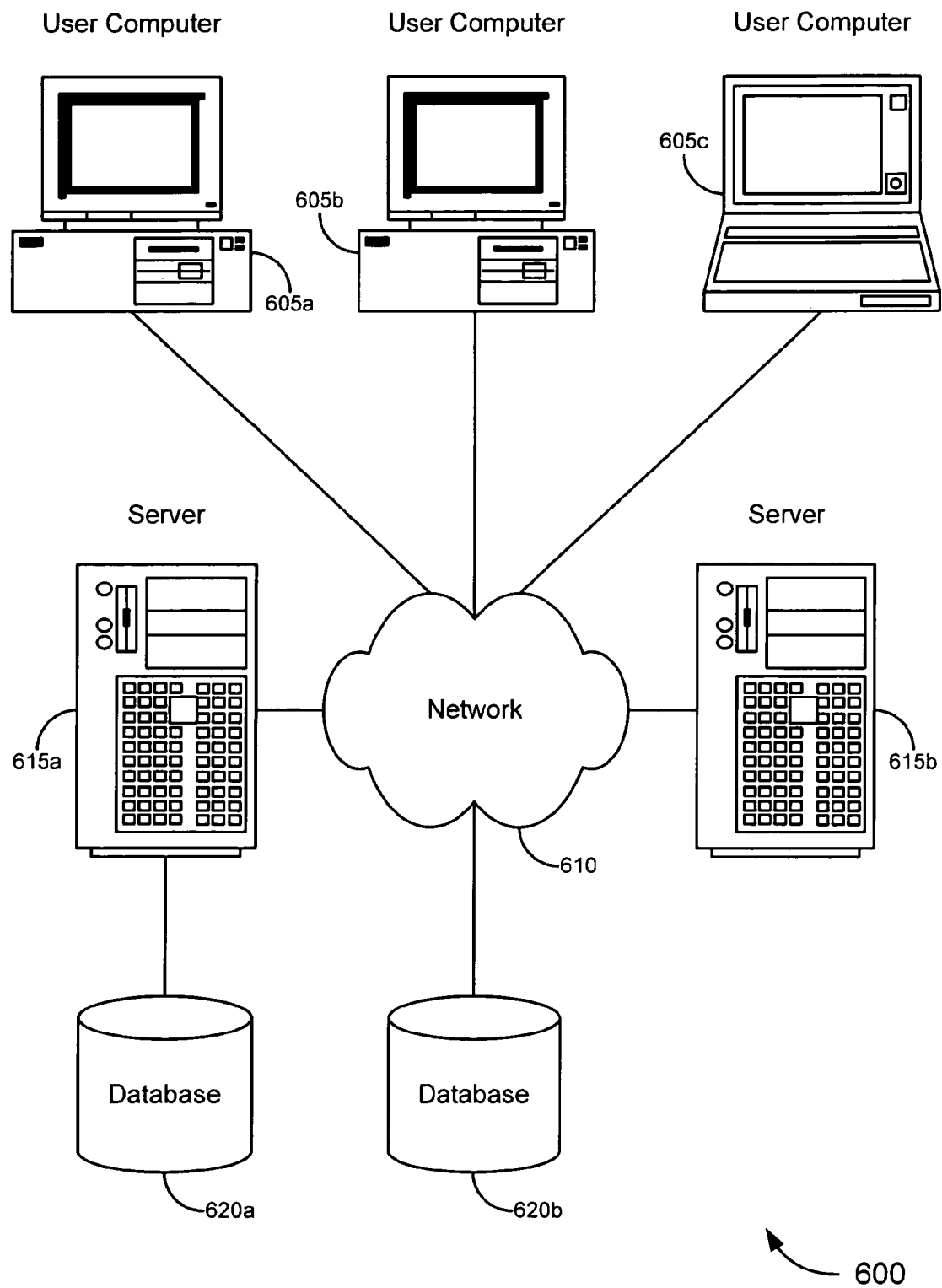
FIG. 6 is a block diagram illustrating a networked system of computers that can be used in accordance with various embodiments of the invention.

FIG. 6 illustrates a schematic diagram of a another system 600 that can be used in accordance with one set of embodiments. The system 600 can include one or more user computers 605, which can be used. In some cases, the user computers 605 can execute the spreadsheet emulator of the invention. In other cases, as described below, for example, the spreadsheet emulator might reside on a server, and/or the user computer can be used to interact with the server (e.g., by providing an example spreadsheet file, by providing input data, and/or by viewing the results from the spreadsheet emulator). The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, APPLE TALK, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system including without limitation any of those discussed above, as well as any commercially-available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, JAVA servers, and the like. In an embodiments, a web server may host a processing system (such as the system 100 described above) and/or components thereof. In some embodiments of the invention, the web server may be configured to serve web pages that can be operated within a web browser on one or more of the user computers 605 to perform methods of the invention.

The server computers 615, in some embodiments, might include one ore more file and or/application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention) and or processing systems (such as the system 100 described above). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from ORACLE, MICROSOFT, Sybase™, IBM™ and the like, which can process requests from database clients running on a user computer 605 and/or another server 615. In some embodiments, an application server can create web pages dynamically for displaying the information in accordance with embodiments of the invention, such as forms for receiving input data 160, and/or out results 170, 175. Data provided by an application server may be formatted as web pages (comprising HTML, JAVASCRIPT code, etc., for example) and/or may be forwarded to a user computer 605 via a web server (as described above, for example). Similarly, a web server might receive web page requests and/or input data from a user computer 605 and/or forward the web page requests and/or input data to an application server.

In accordance with further embodiments, one or more servers 615 can function as a file server and/or can include one or more of the files necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an ORACLE database, that is adapted to store, update, and retrieve data in response to SQL-formatted commands. The database might be controlled and/or maintained by a database server, as described above, for example, and/or might be configured to provide input data 160 for processing.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer system, comprising:
   a processor; and
   a computer readable storage medium having stored thereon software executable by the processor, the software comprising:
      a spreadsheet parser configured to parse an electronic spreadsheet file to identify a calculation model implemented by the electronic spreadsheet file, identify formulas within the electronic spreadsheet file including identifying which input and output cells of the formulas correspond to or are used to hold input and output values for the formulas, and determine relationships between the input cells, output cells, and the formulas, wherein the spreadsheet parser is further configured to determine which of the input cells and output cells hold primary and intermediate values and based on the determination consolidating the formulas, and wherein the calculation model specifies how input values are to be processed and how the formulas are processed;
      an input interface configured to receive, from a business application, a set of data in a structured format, wherein the structured format comprises information specifying how the set of data relates to the calculation model;
      a spreadsheet emulator comprising a calculation engine configured to process the data according to the calculation model; and
      an output interface configured to output a result from the calculation engine, wherein the result comprises one or more data elements that represent values obtained by processing the data and the formulas according to the calculation model.

2. A computer system as recited by claim 1, wherein the structured format comprises eXtensible Markup Language ("XML") formatting information.

3. A computer system as recited by claim 1, further comprising:
   a publisher module configured to publish the result from the calculation engine in HyperText Markup Language ("HTML") format for distribution via a web server.

4. A computer system as recited by claim 1, wherein the output interface is configured to output the result as an eXtensible Markup Language ("XML") file.

5. A computer system as recited by claim 1, wherein the output interface is configured to output the result as an eXtensible Stylesheet Language-Formatting Objects ("XSL-FO") file.

6. A computer system as recited by claim 5, further comprising:
   a publisher module comprising an XSL-FO transformation engine configured to transform the XSL-FO file into a file of a specified format.

7. A computer system as recited by claim 6, wherein the specified format is a format selected from the group consisting of rich text format ("RTF") MICROSOFT WORD document (".doc") format, MICROSOFT EXCEL spreadsheet (".xls") format, Hypertext Markup Language ("HTML") format, and portable document format ("PDF").

8. A computer system as recited by claim 1, wherein the spreadsheet emulator is implemented in a JAVA environment.

9. A method, comprising:
   receiving, at a computer system, an electronic spreadsheet file comprising a calculation model specifying how input values to the spreadsheet are to be processed;
   parsing the electronic spreadsheet file with the computer system to identify the calculation model;
   identifying formulas within the electronic spreadsheet file including identifying which input and output cells of the formulas correspond to or are used to hold input and output values for the formulas, and determine relationships between the input cells, output cells, and the formulas;
   determining which of the input cells and output cells hold primary and intermediate values and based on the determination consolidating the formulas;
   implementing the calculation model in a spreadsheet emulator on the computer system, the spreadsheet emulator comprising a calculation engine;
   receiving, from a business application, a set of data in a structured format, the set of data comprising a set of one or more input values and how the formulas are processed for the calculation model, and the structured format comprising information specifying how the set of data relates to the calculation model;
   processing the set of data with the calculation engine on the computer system to produce a result comprising a set of one or more data elements; and outputting at least a portion of the set of one or more data elements and the formulas in a portable format.

10. A method as recited by claim 9, further comprising:
receiving with the set of data at least one expression configured to use at least one of the one or more input values as input; and
updating the calculation model with the at least one expression.

11. A method as recited by claim 10, wherein updating the calculation model comprises replacing at least one existing expression in the calculation model with the at least one expression.

12. A method as recited by claim 9, wherein the portable format is an eXtensible Markup Language ("XML") format.

13. A method as recited by claim 9, further comprising:
publishing at least a portion of the set of one or more data elements in one or more HyperText Markup Language ("HTML") documents for distribution via a web server.

14. A method as recited by claim 9, wherein:
receiving a set of input data comprises receiving a first set of input values and receiving a second set of input values;
processing the set of data comprises processing the first set of input values to produce a first result comprising a first set of one or more data elements and processing the second set of input values to produce a second result comprising a second set of one or more data elements; and
outputting at least a portion of the set of data elements comprises outputting at least a portion of the first set of data elements and outputting at least a portion of the second set of data elements.

15. A method as recited by claim 9, wherein the spreadsheet emulator is implemented in a Java environment.

16. A method as recited by claim 9, wherein parsing the spreadsheet to identify the calculation model comprises:
identifying, in the electronic spreadsheet file, one or more input cells, each of the one or more input cells being configured to hold an input value;
identifying, in the electronic spreadsheet file, one or more output cells, each of the one or more output cells being configured to hold an output value; and
for each of the output cells, identifying a corresponding formula that takes as input at least one of the one or more input cells and produces the output value.

17. A method as recited by claim 16, wherein implementing the calculation model in the spreadsheet emulator comprises:
for each of the identified input cells, defining an input variable to hold an input data element;
for each of the identified output cells, defining an output variable to hold an output data element;
for each of the identified output cells, defining an expression that applies the formula corresponding to the identified output cell to produce a result that is assigned to the defined output variable for the identified output cell.

18. A method as recited by claim 17, wherein processing the set of data comprises:
for each of the input variables:
(i) identifying a member of the set of input values corresponding to the input variable; and
(ii) setting the value of the identified member as the value of the input variable; and
evaluating each of the defined expressions to produce values for each of the defined output variables.

19. A computer program embodied on a computer readable storage medium, the computer program comprising a set of instructions executable by one or more computers, the set of instructions comprising:
instructions to receive an electronic spreadsheet file comprising a calculation model specifying how input values to the spreadsheet are to be processed;
instructions to parse the electronic spreadsheet file with a computer to identify the calculation model;
instructions to identify formulas within the electronic spreadsheet file including identifying which input and output cells of the formulas correspond to or are used to hold input and output values for the formulas, and determine relationships between the input cells, output cells, and the formulas;
instructions to determine which of the input cells and output cells hold primary and intermediate values and based on the determination consolidating the formulas;
instructions to implement the calculation model in a spreadsheet emulator comprising a calculation engine;
instructions to receive, from a business application, a set of data in a structured format, the set of data comprising a set of one or more input values and how the formulas are processed for the calculation model, and the structured format comprising information specifying how the set of data relates to the calculation model;
instructions to process the set of data with the calculation engine to produce a result comprising a set of one or more data elements; and
instructions to output at least a portion of the set of one or more data elements and the formulas in a portable format.

* * * * *

UNITED STATES PATENT AND TRADEMARK OFFICE
CERTIFICATE OF CORRECTION

| | | |
|---|---|---|
| PATENT NO. | : 8,082,489 B2 | Page 1 of 1 |
| APPLICATION NO. | : 11/408826 | |
| DATED | : December 20, 2011 | |
| INVENTOR(S) | : Jiang | |

It is certified that error appears in the above-identified patent and that said Letters Patent is hereby corrected as shown below:

IN THE SPECIFICATIONS:

In column 2, line 39, delete "processed;" and insert -- processed. --, therefor.

In column 3, line 56, delete "is" and insert -- is a --, therefor.

In column 12, line 9, delete "ore" and insert -- or --, therefor.

In column 12, line 9, delete "and or/application" and insert -- and/or application --, therefor.

In column 12, line 17, delete "and or" and insert -- and/or --, therefor.

IN THE CLAIMS:

In column 14, line 35, in Claim 7, delete "("RTF")" and insert -- ("RTF"), --, therefor.

Signed and Sealed this
Sixth Day of March, 2012

David J. Kappos
*Director of the United States Patent and Trademark Office*